United States Patent Office 3,506,629
Patented Apr. 14, 1970

3,506,629
PROCESS FOR PREPARING ETHYLENE CO-POLYMERS USING AN ACTIVATED ZIEGLER CATALYST
Cornelis E. P. V. van den Berg, Guido Gezellelaan 34, Geleen, Netherlands; Renier J. L. Graff, Graetheidelaan 2, Beek, Limburg, Netherlands; and Willy J. Hendriks, Rijksweg Z 37, Geleen, Netherlands
No Drawing. Filed Feb. 6, 1967, Ser. No. 614,031
Claims priority, application Netherlands, Feb. 9, 1966, 6601610
Int. Cl. C08f 15/40
U.S. Cl. 260—80.78                                9 Claims

ABSTRACT OF THE DISCLOSURE

A process for preparing copolymers of ethylene with at least one other alkene or poly-unsaturated compound or both by bringing a mixture of these monomers in a liquid repartition agent into contact with a coordination catalyst prepared by mixing a vanadium compound soluble in the repartition liquid, preferably containing a halogen atom, with a mono-alkyl aluminum dihalide and/or a di-alkyl aluminum monohalide, the catalyst containing the reaction product of an alcohol or a phenol, preferably monovalent, with a di-alkyl aluminum monohalide and/or with the soluble vanadium compound.

DETAILED DESCRIPTION OF THE INVENTION

The present invention relates to a process for preparing copolymers of ethylene with at least one other alkene or poly-unsaturated compound, or with at least one other alkene and at least one poly-unsaturated compound.

Copolymers of this type can be prepared by bringing a mixture of the monomers in a liquid repartition agent into contact with a coordination catalyst containing a vanadium compound that is soluble in the repartition agent and a hydrocarbon compound of aluminum. It is commonly known to be very important that the poly-unsaturated compound be randomly distributed over the molecules of the polymer, as this will have a favourable effect on the properties of the vulcanized copolymer. It has already been pointed out that it is necessary to this end to use a catalyst whose aluminum component contains less than two hydrocarbon radicals on an average (see Canadian patent specification 713,651). Catalyst components of this type which are recommended are especially mono-alkyl aluminum dihalides and, in particular, mixtures of mono-alkyl aluminum dihalides and di-alkyl aluminum monohalides. It is also possible to obtain excellent products with alkyl alkoxyl aluminum halides, but these have the drawback that they give a lower yield.

It has now been found that a catalyst that is considerably more active than the known catalyst is obtained if the catalyst contains the reaction product of an alcohol or a phenol with a di-alkyl aluminum monohalide and/or with the soluble vanadium compound.

The invention consequently relates to a process for preparing copolymers of ethylene with at least one other alkene, or at least one poly-unsaturated compound, or with at least one other alkene and at least one poly-unsaturated compound, in which process a mixture of these monomers in a liquid repartition agent is brought into contact with a coordination catalyst prepared by mixing a vanadium compound that is soluble in the repartition agent with a mono-alkyl aluminum dihalide or with a mixture of a mono-alkyl aluminum dihalide and a di-alkyl aluminum monohalide, and is characterized in that the catalyst contains the reaction product of an alcohol or a phenol with a di-alkyl aluminum monohalide and/or with the soluble vanadium compound.

Use is preferably made of the reaction product of a di-alkyl aluminum monohalide and/or the soluble vanadium compound with a monovalent alcohol or with a monovalent phenol. Use may also be made, however, of polyvalent alcohols or phenols, provided that the OH-groups in them are not bound to two adjacent carbon atoms.

Use may be made of primary, secondary, and tertiary saturated aliphatic alcohols, and of unsaturated aliphatic and saturated and unsaturated cyclo-aliphatic and aromatic alcohols. Some examples are methanol, ethanol, propanol, and higher saturated aliphatic alcohols, allyl alcohol, cyclo-hexanol and benzyl alcohol. Suitable phenols are, for instance, phenol and cresol.

If the vanadium component of the catalyst contains one or more halogen atoms, such as $VCl_4$ and $VOCl_3$, the alcohol or the phenol may be reacted with this component, before this is mixed with the aluminum component. It is also possible to react the aluminum component with the alcohol or the phenol separately, provided this component is a mixture of a mono-alkyl aluminum dihalide and a di-alkyl aluminum monohalide. It has been found, however, that addition of the alcohol or the phenol to a mono-alkyl aluminum dihalide in the absence of the other catalyst components reduces the activity of the catalyst. However, the preparation of the reaction product of the alcohol or the phenol with a di-alkyl aluminum monohalide need not be based on a mixture of a mono-alkyl aluminum dihalide and a di-alkyl aluminum monohalide, as this reaction product can also be prepared in another way. It is furthermore possible to mix the vanadium component and the aluminum component first with each other and subsequently with the alcohol or the phenol. It is then recommendable to carry out the mixing process in the presence of a soluble unsaturated ethylene copolymer, e.g. a terpolymer of ethylene, propylene, and dicyclopentadiene, to prevent the formation of a precipitate which would reduce the activity of the catalyst. Furthermore, the vanadium compound, the aluminum compound and the alcohol or the phenol may be added separately to the polymerization reaction.

As the reaction between the alcohol or the phenol and the vanadium compound and the aluminum compound proceeds spontaneously, these compounds need not be reacted with each other for a prolonged period of time. Usually the time needed for mixing is long enough to effect the reaction.

In general, the best results are obtained if the alcohol or the phenol is added to the vanadium component. In this case the activity can rise to over 150% of its original value. The best results are usually obtained if the alcohol or the phenol is used in a molar ratio of 2–3 with respect to the vanadium compound. If larger amounts of the alcohol or phenol are used, not a further rise, but rather a fall in activity is usually effected.

If use is made of an aluminum component containing both a mono-alkyl aluminum dihalide and a di-alkyl aluminum monohalide and if the alcohol or the phenol is added to this component, or to both this component and the vanadium component, use is preferably made of a total amount of alcohol or phenol of at most 1 mole per mole of di-alkyl aluminum monohalide, as the activity of the catalyst again decreases if larger amounts of the alcohol or the phenol are used.

The applicant has found that, if the alcohol or the phenol is added to a mixture of a di-alkyl aluminum monohalide and a monoalkyl aluminum dihalide in an amount of at most 1 mole per mole of di-alkyl aluminum monohalide, the alcohol or the phenol reacts only with the di-alkyl aluminum monohalide according to the equation:

$$R-AlX_2 + R_2AlX + R'OH \rightarrow RAlX_2 + RAl(OR')X + RH$$

It is surprising that the resulting mixture of a monoalkyl aluminum dihalide and an alkyl alkoxy aluminum halide is a more active catalyst than an alkyl aluminum sesquichloride, although the two components of the former mixture are each less active than the susquichloride.

The addition of the alcohol or the phenol to a vanadium compound containing a halogen brings about a reaction in which hydrogen halide is formed. Presumably, only one halogen atom of the vanadium compound is then replaced by an OR-group. Anyhow, this much is certain that not more than two halogen atoms are replaced by OR-groups. The replacement of a third halogen atom by an OR-group is probably opposed by the hydrogen halide contained in the reaction mixture.

The process according to the invention can generally be used for the preparation of copolymers of ethylene and at least one other alkene or at least one poly-unsaturated compound, or at least one other alkene and at least one poly-unsaturated compound. Suitable alkenes other than ethylene are propylene, butene-1, penten-1, hexene-1, 4-methyl pentene-1, isobutylene, styrene, and α-methyl styrene. The poly-unsaturated compounds include, for instance, butadiene, isoprene, pentadiene-1,4, hexadiene-1,5, monovinyl cyclohexene, cyclopentadiene, dicyclopentadiene, cyclooctadiene, 5-alkyl-2-norbornenes, 2-alkyl-2,5-norbornadienes, 4,7,8,9-tetrahydro-indene, 5-ethylidene norbonene-2 and bicyclo [4,2,0] octadiene-3,7. The process is particularly suitable for the preparation of copolymers of ethylene with propylene and/or butene-1 and with one or more poly-unsaturated compounds.

The vanadium component of the catalyst is preferably a compound containing a halogen, e.g. $VCl_4$ and, in particular, $VOCl_3$. However, use may also be made of other soluble vanadium compounds.

The polymerization may be carried out in the usual way, e.g. in a solvent, such as hexane, heptane, gasoline or kerosene. Also one or more of the monomers to be polymerized may serve as solvent; the temperature and the pressure are then so chosen that the monomers are present in the liquid state. The reaction temperature may vary from —100 to +100° C., but preferably ranges between —20 and +70° C. The presence usually ranges between 1 and 20 atm., but also lower or higher pressures may be used.

EXAMPLE 1

A number of experiments were carried out, in which a mixture of ethylene, propylene, and dicyclopentadiene was continuously polymerized at a temperature of 30° C. and at a pressure of 2 atm. gauge with a catalyst prepared from ethyl aluminum sesquichloride and $VOCl_3$. The two catalyst components, dissolved in gasoline, were pumped separately into the reactor. The dicyclopentadiene was fed into the reactor together with the $VOCl_3$.

In addition, a constant flow of gas of 200 litres per hour was passed through the reactor, the said flow of gas consisting of 70% by volume of propylene and 30% by volume of ethylene. The ethyl aluminum sesquichloride, $VOCl_3$, and dicyclopentadiene concentrations in the reactor were 2.5, 0.25, and 20 mmoles/litres, respectively.

An alcohol or a phenol was added to the $VOCl_3$, except in the first experiment, which is given for the sake of comparison.

At the end of the polymerization the copolymer was recovered from the reaction mixture and purified in the usual way.

| Experiment | Addition of | Mmoles/ mmole of $VOCl_3$ | Polymerization rate [1] | $C_3$ content, percent by weight | $C_{10}$ content, percent by weight | Hoekstra plasticity | $\eta_{0.1}$ | Gel percent |
|---|---|---|---|---|---|---|---|---|
| 1 | | | 2.04 | 42 | 4.3 | 88 | 4.25 | 19 |
| 2 | Methanol | 3 | 2.8 | 43 | 3.3 | 87 | 3.54 | 4 |
| 3 | Ethanol | 3 | 3.1 | 46 | 2.8 | 85 | 3.22 | 1 |
| 4 | n-Butanol | 3 | 3.1 | 47 | 2.8 | 77 | 2.96 | 2 |
| 5 | n-Octanol | 3 | 3.05 | 45 | 2.5 | 84 | 3.18 | 2 |
| 6 | Cetyl alcohol | 3 | 3.05 | 47 | 2.3 | 74 | 2.7 | 1 |
| 7 | Allyl alcohol | 3 | 3.0 | 43 | 3.0 | 81 | 3.30 | 1 |
| 8 | Isopropanol | 3 | 2.6 | 42 | 3.2 | 83 | 3.02 | 2 |
| 9 | Tert. butanol | 3 | 3.0 | 44 | 4.2 | 81 | 3.18 | 1 |
| 10 | Phenol | 3 | 3.15 | 45 | 2.8 | 80 | 3.14 | 1 |

[1] Polymerization rate = $\dfrac{\text{Number of } C_2+C_3 \text{ moles converted}}{(\text{Number of } C_2+C_3 \text{ moles in the liquid}) \times \text{mmoles of } VOCl_3 \times \text{hour}}$ It follows from the table that the polymerization rate increases considerably upon addition of an alcohol or a phenol. The table moreover shows that the products thus formed contain much less gel and have a higher ratio of Hoekstra plasticity to inherent viscosity than the product not prepared by the process of the invention.

EXAMPLE 2

The experiment, in which the alcohol used was n-butanol, was carried out in the same way as in Example 1, except that the alcohol was added to the ethyl aluminum sesquichloride in an amount of 0.6 mmole per mmole of di-alkyl aluminum monohalide.

The polymerization rate was 2.85. The $C_3$ content and the $C_{10}$ content of the copolymer were 40 and 3.5% by weight, respectively, the Hoekstra plasticity was 81, the $\eta_{0.1}$ 3.77, and the gel percentage 6.

EXAMPLE 3

A copolymer was prepared in the way described in Example 1, with this difference than n-butanol was added to both the ethyl aluminum sesquichloride and the $VOCl_3$, the respective amounts added being 0.2 mmole per mmole of di-alkyl aluminum monohalide and 2 mmoles per mmole of $VOCl_3$.

The polymerization rate was 2.80. The $C_3$ content and the $C_{10}$ content of the copolymer were 42 and 3.1% by weight, respectively, the Hoekstra plasticity was 85, the $\eta_{0.1}$ 3.46, and the gel content 3%.

EXAMPLE 4

The experiment was carried out in the same way as in Example 1, except that no alcohol or phenol was added to the catalyst, but a previously prepared mixture of mono-ethyl aluminum dichloride and ethyl ethoxy aluminum chloride (molar ratio: 1:1) was used for the aluminum component of the catalyst.

The polymerization rate was 2.50. The $C_3$ content and the $C_{10}$ content of the copolymer were 41 and 3.7% by weight, respectively, the Hoekstra plasticity was 85, the $\eta_{0.1}$ 3.65, and the gel content 6%.

What is claimed is:

1. Process for preparing unsaturated vulcanizable copolymers of ethylene with at least one polyunsaturated compound, or with at least one other alkene and at least one polyunsaturated compound, in which process a mixture of these monomers in a liquid repartition agent is brought into contact with a coordination catalyst prepared by mixing a vanadium compound that is soluble in the repartition agent with a mono-alkyl aluminum dihalide or with a mixture of a mono-alkyl aluminum dihalide and a di-alkyl aluminum monohalide, the said process being characterized in that the catalyst contains the reaction product of an alcohol or a phenol with (1) a di-alkyl aluminum monohalide wherein less than 1 mol equivalent of the alcohol or the phenol has been reacted per mol di-alkyl aluminum halide and/or with (2) a soluble vanadium compound wherein the vanadium compound has been reacted with less than 3 mol equivalent of the alcohol or phenol per mol of the vanadium compound.

2. Process according to claim 1, characterized in that the reaction product is one of a di-alkyl aluminum monohalide and/or the soluble vanadium compound with a monovalent alcohol or with a monovalent phenol.

3. Process according to claim 1, characterized in that the vanadium compound contains a halogen atom and in that this compound is made to react with the alcohol or the phenol in the absence of the other catalyst component.

4. Process according to claim 2, characterized in that the vanadium compound contains a halogen atom and in that this compound is made to react with the alcohol or the phenol in the absence of the other catalyst component.

5. Process according to claim 3, characterized in that use is made of 2–3 moles of the alcohol or the phenol per mole of the vanadium compound.

6. Process according to claim 4, characterized in that use is made of 2–3 moles of the alcohol or the phenol per mole of the vanadium compound.

7. Process according to claim 1, characterized in that use is made of a mono-alkyl aluminum dihalide and an alkyl alkoxy aluminum halide.

8. Process according to claim 5, characterized in that use is made of a mixture of a mono-alkyl aluminum dihalide and an alkyl alkoxy aluminum halide.

9. Process according to claim 6, characterized in that use is made of a mixture of a mono-alkyl aluminum dihalide and an alkyl alkoxy aluminum halide.

References Cited
UNITED STATES PATENTS

| | | | |
|---|---|---|---|
| 3,006,904 | 10/1961 | Jahrstorfer | 260—93.7 |
| 3,146,224 | 8/1964 | Coover | 260—93.7 |
| 3,163,611 | 12/1964 | Andersen | 252—429 |

JOSEPH L. SCHOFER, Primary Examiner

R. S. BENJAMIN, Assistant Examiner

U.S. Cl. X.R.

260—88.2